United States Patent
Chen et al.

(10) Patent No.: US 11,023,264 B2
(45) Date of Patent: Jun. 1, 2021

(54) BLUEPRINT APPLICATION STORAGE POLICY

(71) Applicant: VMware, Inc., Palo Alto, CA (US)

(72) Inventors: Ping Chen, Shanghai (CN); Xiaojin Wu, Shanghai (CN); Caixue Lin, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 95 days.

(21) Appl. No.: 15/653,507

(22) Filed: Jul. 18, 2017

(65) Prior Publication Data
US 2019/0026135 A1   Jan. 24, 2019

(51) Int. Cl.
| | |
|---|---|
| *G06F 9/455* | (2018.01) |
| *G06Q 10/06* | (2012.01) |
| *H04L 12/24* | (2006.01) |
| *G06F 21/31* | (2013.01) |
| *H04L 29/06* | (2006.01) |
| *G06Q 10/10* | (2012.01) |

(52) U.S. Cl.
CPC ......... *G06F 9/45533* (2013.01); *G06F 9/455* (2013.01); *G06F 9/45558* (2013.01); *G06F 21/31* (2013.01); *H04L 41/0806* (2013.01); *H04L 41/0893* (2013.01); *H04L 41/12* (2013.01); *H04L 41/5054* (2013.01); *H04L 63/08* (2013.01); *H04L 63/0815* (2013.01); *H04L 63/20* (2013.01); *G06Q 10/06* (2013.01); *G06Q 10/06313* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 9,225,661 B1* | 12/2015 | Yang | G06F 9/5077 |
| 2004/0243699 A1* | 12/2004 | Koclanes | H04L 29/06 709/224 |
| 2013/0073730 A1* | 3/2013 | Hansson | G06F 9/5044 709/226 |
| 2015/0058555 A1* | 2/2015 | Karamanolis | G06F 3/0689 711/114 |
| 2015/0095972 A1* | 4/2015 | Sharma | H04L 63/0815 726/1 |

* cited by examiner

*Primary Examiner* — Aleksandr Kerzhner
*Assistant Examiner* — Eddy Cheung
(74) *Attorney, Agent, or Firm* — Su IP Consulting

(57) ABSTRACT

An example method to manage a virtual machine deployment in a cloud environment includes generating a blueprint comprising a blueprint component corresponding to an application storage policy for all endpoints associated with an infrastructure source in the cloud environment, in response to a determination that the application storage policy comprises a first storage policy of a first endpoint among the endpoints, collecting the first storage policy to deploy the virtual machine on the first endpoint according to the first storage policy, or in response to a determination that the application storage policy does not comprise any storage policy of the first endpoint among the endpoints, creating a storage policy of the first endpoint and collecting the created storage policy to deploy the virtual machine on the first endpoint according to the created storage policy.

20 Claims, 3 Drawing Sheets

ASP 200

```
{
        "ID": "A001"  ← 202
        "Name": "High Availability",
        "Cloud Storage Policies": [
                {
                        "Cloud Type": "vSphere",  ← 204
                        "On-Demand Storage Policy Rule Set":  ← 206
                                "Data Service = vSAN & Number of Failures to Tolerate = 2",
                        "Endpoint Storage Policy Mapping": {  ← 208
                                "vCenter 01": "VVOL_HA",
                                "vCenter 02": "TAG_HA"
                        }
                }
        ... ]
}
```

FIGURE 2

BLUEPRINT APPLICATION STORAGE POLICY

BACKGROUND

A cloud automation product may be used to perform cloud management operations on a cloud system including multiple deployment environments, each having one or more deployment endpoints (endpoints). The cloud automation product may provide a portal where authorized administrators, developers or business users may request various IT services and manage specific cloud and IT resources in compliance with business policies. Requests for such IT services, including infrastructure, applications, desktops, and many others, are processed through a common service catalog.

For example, with Infrastructure as a Service (IaaS), users may model and provision servers and desktops across virtual and physical, private and public, or hybrid cloud infrastructures. Modeling is accomplished by creating a machine blueprint, which is a specification for a machine. The machine blueprints are published as catalog items in the common service catalog. In response to an entitled user requesting a machine based on one of the blueprints, IaaS provisions the machine.

To manage IaaS, an IaaS administrator may configure an infrastructure source by specifying details and credentials of an endpoint so that the cloud automation product may communicate with the infrastructure source. The infrastructure source may include a group of virtualization compute resources or a cloud service account. Some example infrastructure sources may include VMware vSphere®, VMware vCloud® Air™ and VMware vCloud Director®. Some example endpoints corresponding to the example infrastructure resources may include VMware vCenter Server®, VMware vCloud® Air™ OnDemand service and VMware vCloud Director Server®.

Conventionally, IaaS uses the default storage policy of an endpoint for a machine to be provisioned on the endpoint. Some attempts have been proposed to select a preferred storage policy among various storage policies supported by the endpoint for the machine. This preferred storage policy may be different from the default storage policy of the endpoint. However, such attempts may only work for the specific endpoint, not all endpoints in the cloud.

BRIEF DESCRIPTION OF THE DRAWINGS

FIG. 2 illustrates an example application storage policy (ASP) included in a policy service of an application manager, according to one or more embodiments of the present disclosure.

DETAILED DESCRIPTION

Figure 1:
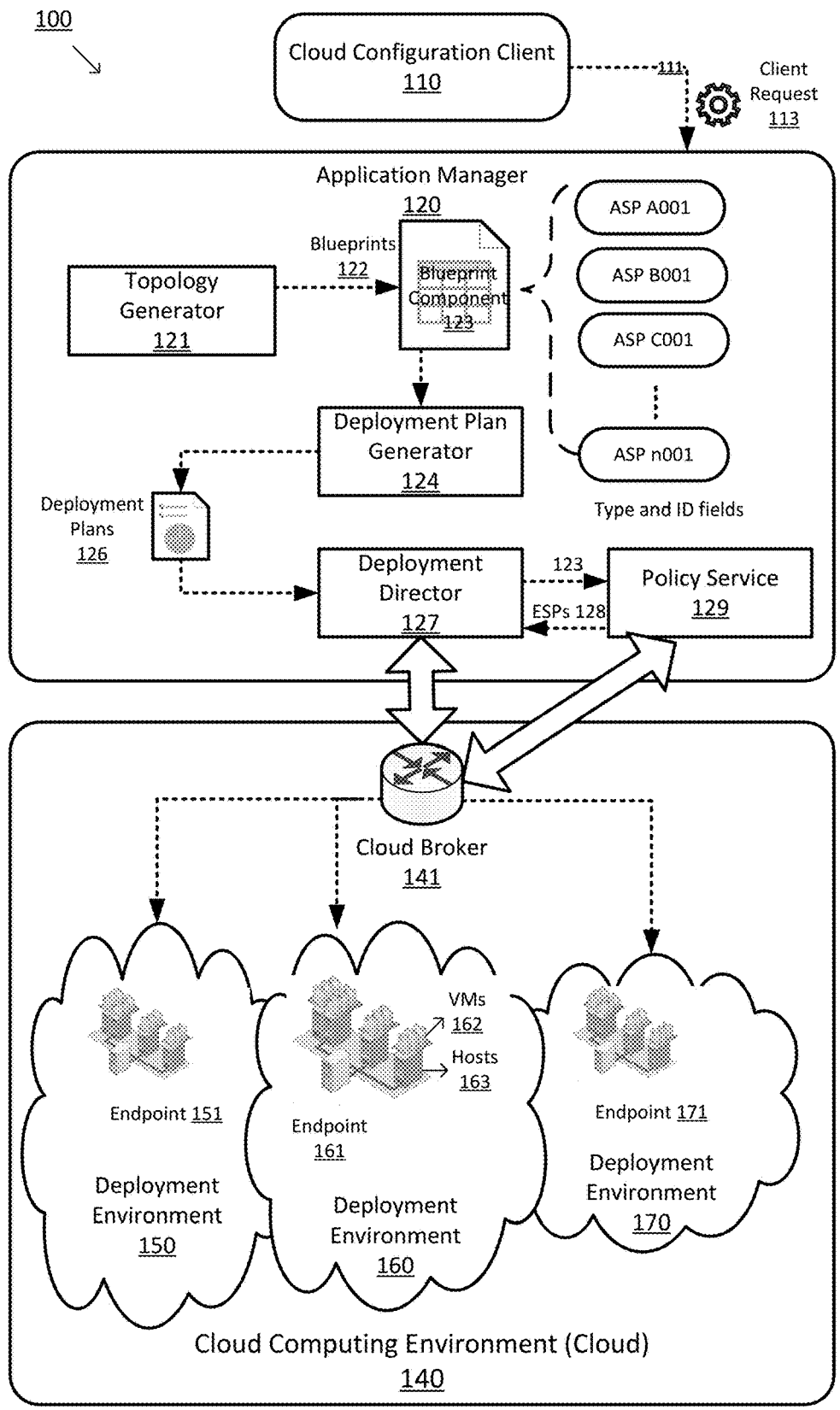
FIG. 1 illustrates a block diagram of a system to manage virtual machine and/or application deployment in a cloud environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of example system 100 configured to deploy one or more machines and/or applications in a cloud environment, according to one or more embodiments of the present disclosure. In FIG. 1, system 100 may include application manager 120 and cloud computing environment 140 (or "cloud 140"). Application manager 120 may be configured to manage cloud computing environment 140, as well as one or more deployment environments 150, 160, and 170 contained therein. Application manager 120, which may be accessed by one or more cloud configuration clients 110, may include, among other hardware/software modules and components, topology generator 121, deployment plan generator 124, deployment director 127 and policy service 129. Specifically, application manager 120 may be configured to deploy one or more virtual machines and/or applications in any deployment environments 150, 160 and 170 of cloud 140 according to a universal application storage policy included in policy service 129.

In some embodiments, cloud configuration client 110 may be installed on a client computer (e.g., a personal computer or workstation) to communicate with application manager 120 to access and manage cloud 140. Cloud configuration client 110 may interact with application manager 120 via Transmission Control Protocol/Internet Protocol (TCP/IP), Hypertext Transfer Protocol (HTTP), or any other network communication means. Alternatively, cloud configuration client 110 may be implemented as a software/hardware module executing directly on application manager 120. In some embodiments, cloud configuration client 110 may be implemented using a VMware vSphere® client.

In some embodiments, a "cloud computing environment", or a "cloud", may be a network-based, computing architecture that provides shared pools of cloud resources on demand; and a "virtual machine cloud computing environment", or "VM cloud", may be a cloud computing environment implemented using some virtualized computing resources. Cloud 140 may contain, among other components, one or more VMs and physical machines. Application manager 120 may be responsible for managing cloud 140, and implementing various cloud functionalities such as resource pooling, resource allocating, high-availability, and automation etc. In some embodiments, cloud 140 may be constructed using products such as the VMware vSphere® or VMware vCloud®. Application manager 120 may be implemented using the VMware vRealize®.

In some embodiments, application manager 120 may construct cloud 140 by creating one or more VMs, in order to implement in cloud 140 some cloud-based functionality, such as VM high-availability, VM load-balancing, VM resource distributions, etc. VMs may be created based on one or more physical machines having a "physical hardware platform" (e.g., an x86 architecture platform). The physical hardware platform may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1).

In some embodiments, the physical machines may include a "hypervisor" to construct a "virtual hardware platform" for the VMs based on the physical hardware platform. The virtual hardware platform of the VMs may be configured with one or more "virtual hardware components" such as, without limitation, one or more virtual CPUs, virtual memory, virtual storage, virtual NIC, and/or additional virtual components. The virtual hardware components may emulate the behaviors and the computing capabilities of the physical hardware components, thereby allowing the VMs to function as if they were physical machines. Further, application manager 120 may pool all the resources in the VMs together to form "virtual computing resources" in cloud 140.

In some embodiments, cloud 140 may be used to implement one or more deployment environments 150, 160, and 170 to deploy one or more virtual machines and/or applications on one or more endpoints (e.g., endpoints 151, 161, or 171) in one or more deployment environments 150, 160, and 170. More specifically, any endpoint may include hosts (e.g., hosts 163 at endpoint 161) and virtual machines (e.g., VMs 162 at endpoint 161) supported by the hosts.

A "deployment environment" may refer to a relatively independent/isolated environment having a set of physical machines and configurations. As depicted in FIG. 1, application manager 120 may configure in cloud 140 multiple deployment environments 150, 160 and 170. Application manager 120 may create and manage the various deployment environments in cloud 140 via Representational State Transfer (REST) Application Programming Interface (API) or any other client-server communication protocols. In some embodiments, a deployment environment may include one or more endpoints. Some example endpoints may include VMware vCenter Server®, VMware vCloud® Air™ OnDemand service and VMware vCloud Director Server®.

In some embodiments, application manager 120 may utilize cloud broker 141 to access and manage cloud 140, deployment environments 150, 160 and 170 and endpoints 151, 161 and 171. A "cloud broker" may be an application or module tailored to a specific cloud, and configured to perform various tasks in view of the specific cloud's customized implementation and configurations. For example, cloud broker 141 may be configured to manage virtual machine and/or application deployment on endpoints 151, 161 and/or 171.

In some embodiments, cloud broker 141 may be implemented as a component or service of cloud 140. In other words, cloud broker 141 may be operating within cloud 140's environment. Alternatively, cloud broker 141 may be implemented as an application or service external to cloud 140. In this case, cloud broker 141 may be located at a third-party system, acting as a cloud service customer of cloud 140, and may interact with cloud 140 using network communications. In addition, cloud broker 141 may also be installed as an internal component of application manager 120.

In some embodiments, application manager 120 may receive (111) one or more client requests 113, requesting the deployment of one or more VMs and/or applications in cloud 140. In some embodiments, application manager 120 may implement a blueprint deployment approach to fulfill the client requests.

In some embodiments, application manager 120 may utilize topology generator 121 to generate one or more blueprints 122 for one or more virtual machines and/or applications to be deployed in cloud 140. Blueprints 122 may be generated based on one or more published machine blueprints, one or more published anything as a service (XaaS) blueprints and/or software components. A machine blueprint may determine the attributes of the machine, the manner in which it is provisioned, and its policy and management settings. An Xaas blueprint may refer to a VMware vRealize® Orchestrator™ workflow that can provision resources, make changes to provisioned resources, or behaves as a service that performs a task.

In some embodiments, blueprints 122 may include blueprint component 123. Any blueprint component 123 may include a type field describes the type (e.g., ASP) of blueprint components 123 and an ID field (e.g., A001, B001 . . . n001) to identify the item of the type. With the type and ID fields (e.g., ASP A001), blueprint component 123 may correspond to an application storage policy (ASP) A001 included in policy service 129. The application storage policy may include one or more storage policies of one or more endpoints associated with an infrastructure source. The application storage policy may also include one or more on-demand storage policy rule sets of other endpoints (other from the one or more endpoints) associated with the infrastructure source. Accordingly, the application storage policy may include storage policy information of all endpoints in cloud 140. In some embodiments, one example application storage policy 200 will be further described below.

In some embodiments, topology generator 121 may utilize blueprints 122 to capture the hardware infrastructure that can support the provision of the virtual machines. Examples of the hardware infrastructure include application servers, database servers, monitoring services, web servers, messaging services, and other middleware services, as well as virtual computing resources that can be provisioned from cloud 140.

In some embodiments, in response to a client request from application configuration client 110, application manager 120 may initiate a deployment process to deploy one or more virtual machines and/or applications in cloud 140. Specifically, application manager 120 may invoke deployment plan generator 124 to construct deployment plan 126 based on blueprints 122. In some embodiments, deployment plan 126 comprises information associated with blueprint component 123.

In some embodiments, application manager 120 may utilize deployment director 127 to execute deployment plan 126. Deployment director 127 may communicate with cloud broker 141 to access cloud computing environment 140 and select one or more endpoints (e.g., endpoints 151, 161 and 171) within cloud 140 to deploy one or more virtual machines and/or applications according to deployment plan 126. In some embodiments, endpoints 151, 161 and 171 may be different VMware vCenter Server® configured to manage various virtual machines supported by VMware vSphere® in deployment environments 150, 160 and 170, respectively.

In some embodiments, deployment director 127 may know all endpoints, including endpoints 151, 161 and 171, of cloud 140 in deployment environment 150, 160 and 170. Deployment director 127 is configured to query policy service 129, including the application storage policy, the storage policy of each endpoint based on blueprint component 123.

In some embodiments, in response to the application storage policy including a storage policy of an endpoint (i.e., endpoint storage policy, ESP 128), policy service 129 is configured to report ESP 128 back to deployment director 127.

On the other hand, when policy service 129 cannot find a storage policy of the endpoint in the application storage policy, policy service 129 may report to deployment director 127 the failure of identifying the endpoint storage policy. In some embodiments, deployment director 127 may request policy service 129 to create ESP 128 for the endpoint according to an on-demand storage policy rule set included in the application storage policy. Policy service 129 may then create ESP 128 for the endpoint through cloud broker 141 and report created ESP 128 back to deployment director 127. An example on-demand storage policy rule set 206 will be further described below.

Therefore, deployment director 127 may receive ESPs 128 of all endpoints in cloud 140 from policy service 129. For example, in response to that deployment director 127 determines to deploy a first virtual machine on endpoint 151 and a second virtual machine on endpoint 161, deployment director 127 may utilize ESPs 128 of endpoints 151 and 161 to allocate the storage resources in deployment environments 150 and 160 based on blueprint component 123 included in blueprints 122, respectively.

In conventional approaches, conventional deployment director may only deploy virtual machine with the storage policy (default or selected) provided by the single endpoint (e.g., one of endpoints 151, 161 and 171) selected to deploy the virtual machine. On the other hand, deployment director 127 may deploy virtual machine and/or applications on any endpoint (e.g., 151, 161 and 171) based on a blueprint component 123 after deployment director 127 determines the endpoint to deploy the virtual machine.

FIG. 2 illustrates an example application storage policy (ASP) 200 included in a policy service of an application manager, according to one or more embodiments of the present disclosure. In some embodiments, in conjunction with FIG. 1, the example policy service may correspond to policy service 129 as set forth above. In some embodiments, ASP 200 may be set up by an infrastructure administrator. ASP 200 may include various items, without limitation, ID field 202, cloud type information 204, on-demand storage policy rule set 206 and endpoint storage policy information 208.

In some embodiments, ID field 202 may be used for the system to refer a blueprint component (e.g., blueprint component 123) with proper type field information (e.g., ASP) and ID field information (e.g., A001) to refer to ASP 200, which has the same ID field information of "A001."

In some embodiments, cloud type information 204 may correspond to a type of cloud in a cloud computing environment. In conjunction with FIG. 1, assuming one type of cloud in cloud computing environment 140 is managed by VMware vSphere®, cloud type information 204 may be set as "vSphere" to represent the type of cloud. On-demand storage policy rule set 206 and endpoint storage policy information 208 may be set to address storage policies for all endpoints associated with this type of cloud.

In some embodiments, in conjunction with FIG. 1, assuming VMware vSphere® endpoints include endpoints 151, 161 and 171, which corresponds to VMware vCenter Server® 01 (vCenter 01), VMware vCenter Server® 02 (vCenter 02) and VMware vCenter Server® 03 (vCenter 03), respectively. In some embodiments, ASP 200 includes endpoint storage policy information 208 for vCenter 01 and vCenter 02. For example, endpoint storage policy information 208 may include the high availability storage policy in virtual volumes systems (VVOL_HA) for vCenter 01 and the high availability storage policy in tag storage systems (TAG_HA) for vCenter 02.

In some embodiments, endpoint storage policy information 208 may not be set for all endpoints associated with specific cloud type represented by cloud type information 204. For example, ASP 200 does not have endpoint storage policy information 208 for vCenter 03. To address these endpoints, ASP 200 may include on-demand storage policy rule set 206 for these endpoints. In conjunction with FIG. 1, in some embodiments, policy service 129 may create storage policy 128 to be used for these endpoints (e.g., vCenter 03, endpoint 171) according to on-demand storage policy rule set 206. For example, policy service 129 may create storage policy 128 that "Number of Failures to Tolerate=2" in virtual storage area network (e.g., VMware vSAN®) systems for vCenter 03.

Figure 3:
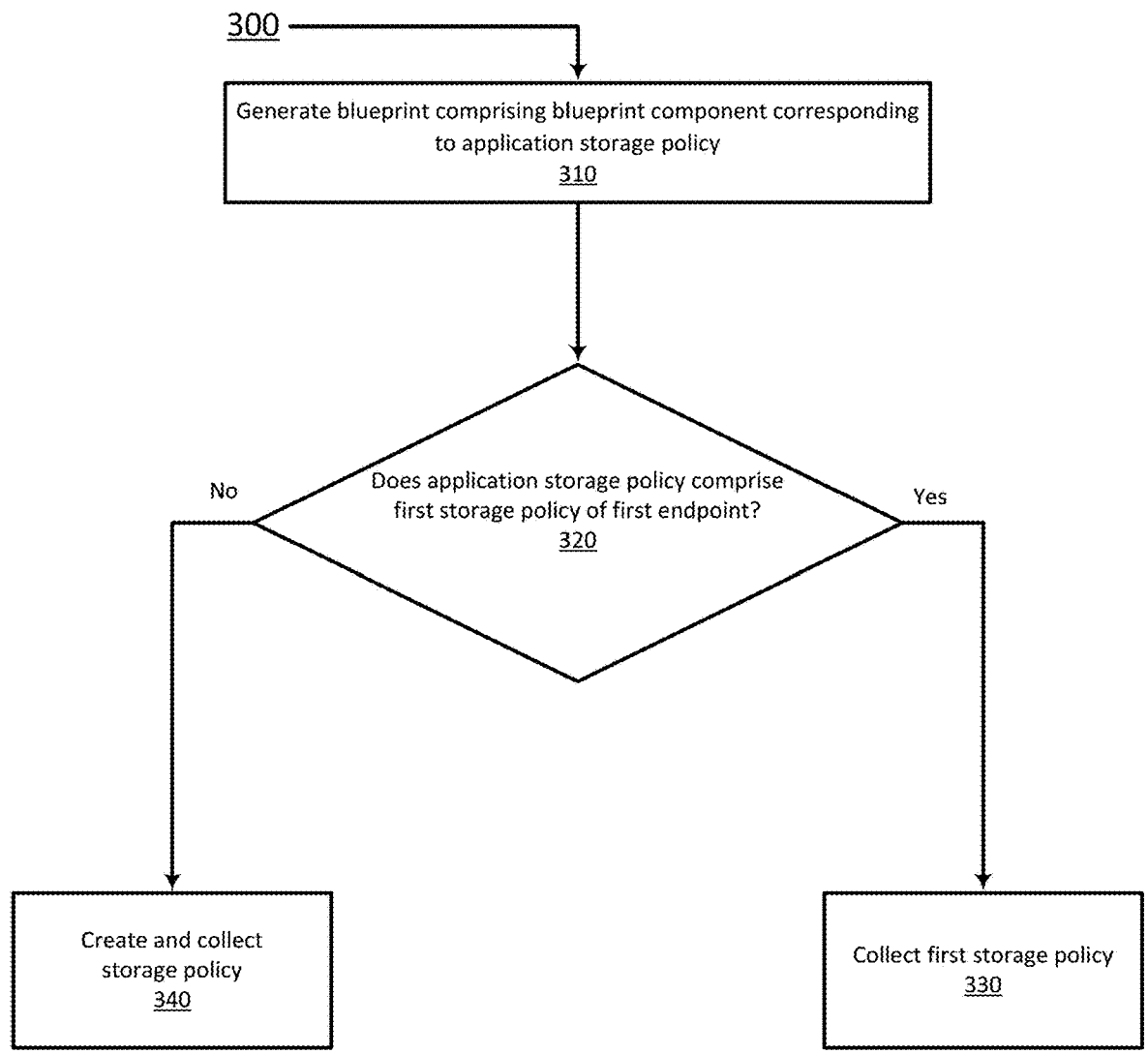
FIG. 3 shows a flow diagram illustrating a process to manage virtual machine and/or application deployment in a cloud environment, according to one or more embodiments of the present disclosure.

FIG. 3 shows a flow diagram illustrating example process 300 to manage virtual machines and/or applications deployment in a cloud environment, according to one or more embodiments of the present disclosure. Processes 300 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, an application manager may be configured to generate one or more blueprints. The blueprints may include a blueprint component corresponding to an application storage policy, which is included in a policy service of the application manager. In some embodiments, the application storage policy may include one or more respective storage policies for some endpoints associated with an infrastructure source. For other endpoints associated with the infrastructure source, the application storage policy may also include one or more on-demand storage policy rule sets to create respective storage policies for these other endpoints.

At block 320, the application manager may be configured to check a first endpoint associated with the infrastructure source and determine whether the first endpoint has a corresponding first storage policy in the application storage policy.

At block 330, in response to a determination that the application storage policy comprises the first storage policy, the application manager may be configured to collect the first storage policy and/or the information associated with the first end point. At block 340, in response to a determination that the application storage policy does not comprise any storage policy of the first endpoint, the application manager may be configured to create a storage policy of the first endpoint based on the on-demand storage policy rule sets and collect the created storage policy and/or the information associated with the first endpoint. Blocks 320, 330 and 340 may be repeated for all endpoints associated with the infrastructure source. Similar processes may be used for the other endpoints, so the application manager may collect storage policies corresponding to all possible endpoints based on the application storage policy. In response to the application manager determines to deploy a virtual machine on an endpoint, the application manager may be configured to deploy the virtual machine according to the collected storage policy of the endpoint.

Thus, systems and methods for managing virtual machine deployment in a cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method to manage deployment of virtual machines in a cloud environment including a first deployment environment and a second deployment environment, the method comprising:

generating a blueprint comprising an application storage policy to deploy one or more virtual machines in the first deployment environment and one or more virtual machines in the second deployment environment, wherein the first deployment environment and the second deployment environment are physically isolated, and the application storage policy includes a plurality of storage policies of endpoints in the first deployment environment and the second deployment environment;

prior to deploying any virtual machine on a first endpoint in the first deployment environment or a second endpoint in the second deployment environment:

determining that the application storage policy comprises a first storage policy of the first endpoint and collecting the first storage policy; and determining that the application storage policy comprises a second storage policy of the second endpoint and collecting the second storage policy, wherein the second storage policy is different than the first storage policy; and after collecting the first storage policy and the second storage policy, allocating storage resources in the first deployment environment to deploy a first virtual machine on the first endpoint according to the first storage policy and allocating storage resources in the second deployment environment to deploy a second virtual machine on the second endpoint according to the second storage policy.

2. The method of claim 1, further comprising, determining that the application storage policy does not comprise any storage policy of the first endpoint and creating the first storage policy of the first endpoint and collecting the first storage policy.

3. The method of claim 1, further comprising, determining that the application storage policy does not comprise any storage policy of the second endpoint and creating the second storage policy of the second endpoint and collecting the second storage policy.

4. The method of claim 2, wherein the creating the first storage policy of the first endpoint is based on an on-demand storage policy rule set comprised in the application storage policy.

5. The method of claim 4, wherein the on-demand storage policy rule set is associated with an on-demand storage policy allocation approach supported by the first deployment environment and the second deployment environment.

6. The method of claim 2, prior to the creating the first storage policy of the first endpoint, further comprising communicating with the first endpoint through a cloud broker.

7. The method of claim 1, further comprising after collecting storage policies of all endpoints in the first deployment environment and the second deployment environment, selecting the first endpoint among the endpoints to deploy the first virtual machine.

8. A non-transitory computer-readable storage medium, containing a set of instructions which, in response to execution by a processor, cause the processor to perform a method to manage deployment of virtual machines in a cloud environment including a first deployment environment and a second deployment environment, the method comprising:

generating a blueprint comprising an application storage policy to deploy one or more virtual machines in the first deployment environment and one or more virtual machines in the second deployment environment, wherein the first deployment environment and the second deployment environment are physically isolated, and the application storage policy includes a plurality of storage policies of endpoints in the first deployment environment and the second deployment environment;

prior to deploying any virtual machine on a first endpoint in the first deployment environment or a second endpoint in the second deployment environment:

determining that the application storage policy comprises a first storage policy of the first endpoint and collecting the first storage policy; and determining that the application storage policy comprises a second storage policy of the second endpoint and collecting the second storage policy, wherein the second storage policy is different than the first storage policy; and after collecting the first storage policy and the second storage policy, allocating storage resources in the first deployment environment to deploy a first virtual machine on the first endpoint according to the first storage policy and allocating storage resources in the second deployment environment to deploy a second virtual machine on the second endpoint according to the second storage policy.

9. The non-transitory computer-readable storage medium of the claim 8, wherein the method further comprising, determining that the application storage policy does not comprise any storage policy of the first endpoint and creating the first storage policy of the first endpoint and collecting the first storage policy.

10. The non-transitory computer-readable storage medium of the claim 8, wherein the method further comprising, determining that the application storage policy does not comprise any storage policy of the second endpoint and creating the second storage policy of the second endpoint and collecting the second storage policy.

11. The non-transitory computer-readable storage medium of the claim 9, wherein the creating the first storage policy of the first endpoint is based on an on-demand storage policy rule set comprised in the application storage policy.

12. The non-transitory computer-readable storage medium of the claim 11, wherein the on-demand storage policy rule set is associated with an on-demand storage policy allocation approach supported by the first deployment environment and the second deployment environment.

13. The non-transitory computer-readable storage medium of the claim 9, wherein prior to the creating the first storage policy of the first endpoint, the method further comprising communicating with the first endpoint through a cloud broker.

14. The non-transitory computer-readable storage medium of the claim 8, wherein the method further comprising after collecting storage policies of all endpoints in the first deployment environment and the second deployment environment, selecting the first endpoint among the endpoints to deploy the virtual machine.

15. A system to manage deployment of virtual machines in a cloud environment, the system comprising: an application manager comprising:

a topology generator configured to generate a blueprint comprising an application storage policy to deploy one or more virtual machines in a first deployment environment and one or more virtual machines in a second deployment environment, wherein the first deployment environment and the second deployment environment are physically isolated, and the application storage policy includes a plurality of storage policies of endpoints in the first deployment environment and the second deployment environment; and a deployment director configured to:

prior to deploying any virtual machine on a first endpoint in the first deployment environment or a second endpoint in the second deployment environment:

determine that the application storage policy comprises a first storage policy of the first endpoint and collect the first storage policy;

determine that the application storage policy comprises a second storage policy of the second endpoint and collect the second storage policy, wherein the second storage policy is different than the first storage policy; and after collecting the first storage policy and the second storage policy, allocate storage resources in the first deployment environment to deploy a first virtual machine on the first endpoint according to the first storage policy and allocate storage resources in the second deployment environment to deploy a second virtual machine on the second endpoint according to the second storage policy.

16. The system of claim 15, wherein the deployment director is configured to determine that the application storage policy does not comprise any storage policy of the first endpoint and create the first storage policy of the first endpoint and collect the first storage policy.

17. The system of claim 15, wherein the deployment director is configured to determine that the application storage policy does not comprise any storage policy of the second endpoint and create the second storage policy of the second endpoint and collect the second storage policy.

18. The system of claim 16, further comprising a policy service configured to create the first storage policy of the first endpoint based on an on-demand storage policy rule set comprised in the application storage policy.

19. The system of claim 18, wherein the on-demand storage policy rule set is associated with an on-demand storage policy allocation approach supported by the first deployment environment and the second deployment environment.

20. The system of claim 16, wherein the policy service is configured to, prior to creating the first storage policy of the first endpoint, communicate with the first endpoint through a cloud broker.

* * * * *